United States Patent
Pistacchio et al.

(10) Patent No.: US 9,424,858 B1
(45) Date of Patent: Aug. 23, 2016

(54) ACOUSTIC RECEIVER FOR UNDERWATER DIGITAL COMMUNICATIONS

(71) Applicants: David J Pistacchio, Narragansett, RI (US); Peter A Child, Barrington, RI (US)

(72) Inventors: David J Pistacchio, Narragansett, RI (US); Peter A Child, Barrington, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 89 days.

(21) Appl. No.: 14/256,319

(22) Filed: Apr. 18, 2014

(51) Int. Cl.
*G10L 19/26* (2013.01)
*G10L 19/00* (2013.01)

(52) U.S. Cl.
CPC ...... *G10L 19/265* (2013.01); *G10L 2019/0011* (2013.01)

(58) Field of Classification Search
CPC ..................................................... G10L 19/265
See application file for complete search history.

(56) References Cited

U.S. PATENT DOCUMENTS

| | | | |
|---|---|---|---|
| 6,351,094 B1* | 2/2002 | Green | H02P 25/083 318/700 |
| 2014/0023199 A1* | 1/2014 | Giesbrecht | G10L 21/0216 381/71.1 |
| 2014/0046878 A1* | 2/2014 | LeComte | G10L 25/51 706/12 |

* cited by examiner

*Primary Examiner* — Mohammad Ghayour
*Assistant Examiner* — Lennin Rodriguezgonzale
(74) *Attorney, Agent, or Firm* — James M. Kasischke; Michael P. Stanley

(57) ABSTRACT

A system and method and system for receiving communications signals coded at transmission in a frequency hopping waveform includes a sensor that receives acoustic data. A detector joined to the sensor receives the data and separates signals from background noise. Logic determines when the signal ends. Clusters of signals are processed and grouped into combinations of symbols. A computer translates these symbols into messages using a codebook. When multiple possibilities exist, the message is selected from the codebook that maximizes a similarity score. Additional logic is provided to handle situations where unwanted signals are mixed into an otherwise valid symbol sequence, to find the best subset of signals forming a valid message. Selected messages are provided as output to users. In further details, the detector filters the acoustic data and transforms it to the frequency domain. A power spectrum is calculated for detecting signals in specific frequency bands. Integrations are performed over groups of frequencies. A detection is indicated when one integrator has a large variation from the expected background level.

8 Claims, 9 Drawing Sheets

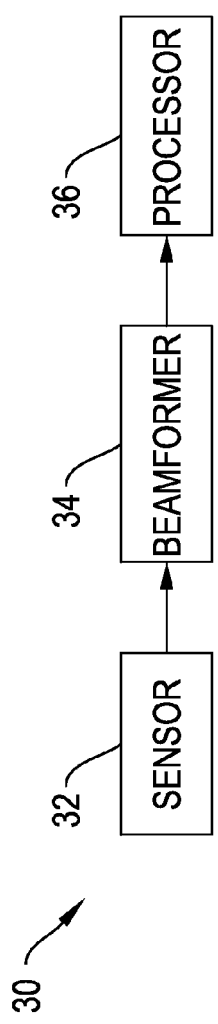
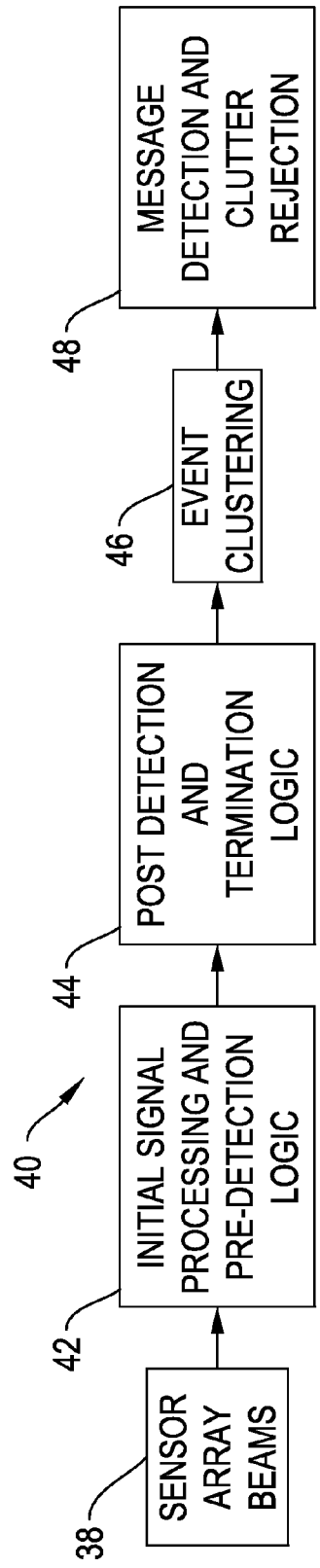

ACOUSTIC RECEIVER FOR UNDERWATER DIGITAL COMMUNICATIONS

STATEMENT OF GOVERNMENT INTEREST

The invention described herein was made in the performance of official duties by one or more employees of the department of the navy, and the invention herein may be manufactured, practiced, used, and/or licensed by or for the government of the United States of America without the payment of any royalties thereon or therefor.

CROSS REFERENCE TO OTHER PATENT APPLICATIONS

None.

BACKGROUND OF THE INVENTION

1) Field of Invention

The present invention generally relates to methods of detecting frequency hopping communications signals in the presence of clutter.

2) Description of the Prior Art

Acoustic communication between underwater platforms is often desirable. FIG. 1 and the ensuing text provide a brief explanation of this type of communication. A signal source 10 is joined to a transducer 12 to produce an encoded acoustic signal through water 14. The acoustic signal 16A, 16B and 16C travels through the water 14 to a sensor 18, such as a hydrophone, joined to a receiver 20.

As shown, the acoustic signal can follow several paths. A direct path 16A through an acoustic channel 22 is preferred. Acoustic channel 22 is the region of water 14 defined by thermal boundaries 24A and 24B. The acoustic signal can also travel in path 16B where it bounces off water 14 surface 26 or in path 16C where it bounces off water 14 bottom 28. Other paths are also possible. Each of these paths will arrive at sensor 18 at a different time. Some paths may interfere with later transmitted acoustic signals.

The acoustic signal can be spread across multiple acoustic frequencies in a technique known as frequency hopping. In this technique, a signal is transmitted at several different frequencies. For example, four fixed length signals positioned sequentially in time at frequencies 1000 Hz, 1040 Hz, 1020 Hz and 1010 Hz are detected and values are assigned to represent the numbers 0421 by sequence of transmission and frequency variation. The numbers correspond to a message in a codebook shared between the transmitter and the receiver.

A standard method for decoding messages transmitted by frequency hopping is by correlating the entire data sequence with replicas of all possible time-frequency combinations that represent possible messages. The method then picks the time-frequency combination that best corresponds with a message. Best correspondence can be determined by correlation magnitude, signal strength or some other metric. Distortion from source/receiver motion and complex acoustic propagation can be handled by estimation of channel properties and pre-filtering with inverse transfer functions. Under benign circumstances such as with white noise, this approach may allow message decoding at a low signal-to-noise ratio. However, performance can be limited in the presence of interference from other sources that may overlap with communications waveforms.

As can be seen, there is a need for an acoustic receiver for underwater digital communications that provides robust performance in the presence of multipath signal propagation and clutter.

SUMMARY OF THE INVENTION

In one aspect of the present disclosure, a system of detecting communications signals can include a sensor configured to detect a plurality of individual communication signals, and a processing device attached to the sensor. The processing device can be configured to separately filter each of the individual signal detections such that they are within a specified bandwidth range, a duration range, a frequency range and time separation range. Here the term filter indicates a selection process where signals within the specified ranges are kept and all others outside the range are rejected from further processing. The processing device can be configured to assign one of a plurality of predetermined values to each of the filtered individual detections based upon the estimated frequency of the signal that is associated with each detection. For example, four fixed length signals positioned sequentially in time at frequencies 1000 Hz, 1040 Hz, 1020 Hz and 1010 Hz are detected and values are assigned to represent the numbers 0421 by sequence of transmission and frequency variation. Combinations of the assigned values may be compared with a codebook of predetermined messages. These values can be associated with a sequence of symbols. The comparison process involves exhaustive enumeration of all possible combinations of values in sets equal to a symbol sequence length and detected within a specified time window to each of the messages in the codebook. The comparison is complete when at least one message matches a combination of assigned values. If multiple messages in the codebook match, the message with the highest similarity score is selected.

In one other aspect of the present disclosure, a method includes detecting a plurality of individual communication signals. Each of the individual signal detections may be separately filtered based on the signals associated with the detections being within a specified bandwidth range, a time duration range, a frequency range and a time separation range. One of a plurality of predetermined values can be assigned to each of the detected individual communication signals based on the estimated frequency of the signal. Upon detection of an expected set of values, the set may be compared with a collection of predetermined messages in a codebook. The set of newly detected values corresponding to a specified time period can include extra bits generated by detection of overlapping clutter signals. In this instance the method may compare all possible combinations of bits making up candidate messages against the message templates in the code book and select the message that produces the highest similarity score.

These and other features, aspects and advantages of the present invention will become better understood with reference to the following drawings, description and claims.

BRIEF DESCRIPTION OF THE DRAWINGS

FIG. 2 is a block diagram of an acoustic receiver for underwater digital communications;

FIG. 3 is a high-level flowchart of signal detection and decoding processing performed by the processing device of FIG. 2;

DETAILED DESCRIPTION OF THE INVENTION

Figure 1:
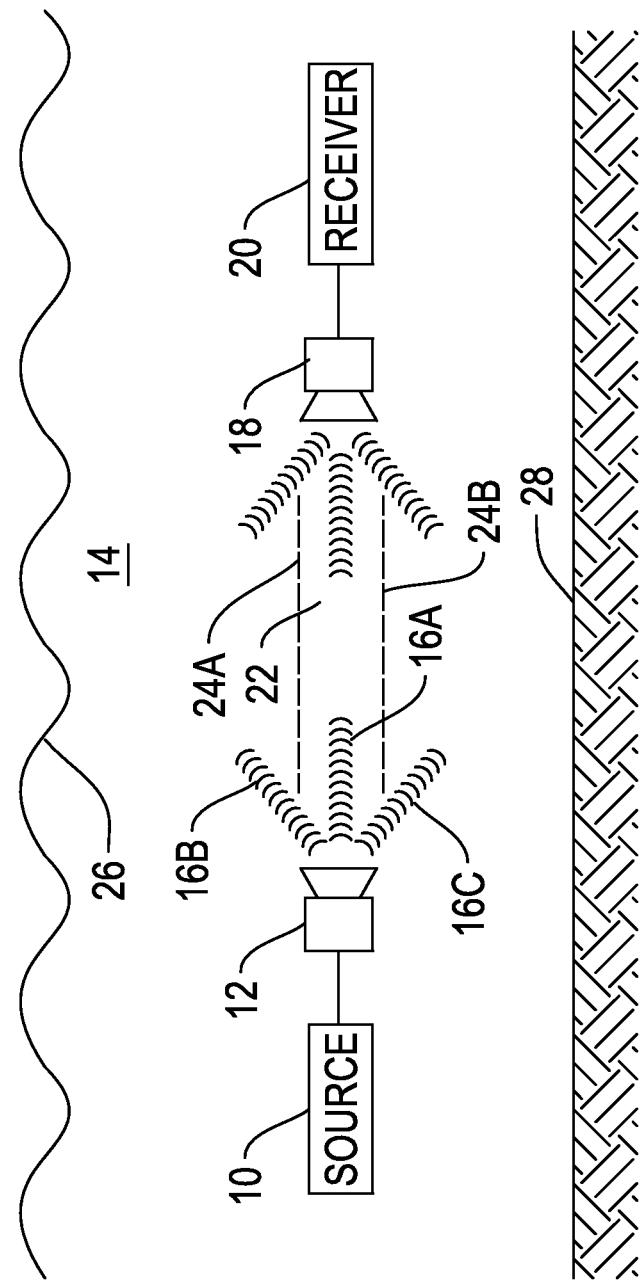
FIG. 1 is a diagram of the known acoustic communication problem addressed by the inventive apparatus.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present disclosure relates generally to detecting and decoding received acoustic communication signals in the presence of clutter. Received signals may be processed while rejecting interference from man-made or biologic clutter that may overlap in time and frequency with the received communication signals.

The present disclosure, more specifically, relates to methods of detecting and decoding low bit rate, acoustic communication signals received in the presence of clutter. Undesirable signal detections within a sequence of received signals may be rejected using parametric filters based on bandwidth, duration, frequency and time separation of incoming signals. Decoding the signal may involve evaluating all combinations of expected signal sets and selecting a bit sequence with a highest similarity score to an optimum quantity.

The invention may be implemented with either hardware, such as a computer processor, computer, application specific chip or other processing device, or with software on a general purpose computing device. The invention may further be implemented with a combination of hardware and software.

Referring now to the figures wherein the drawings are for purposes of illustrating embodiments of the present disclosure only, and not for purposes of limiting the same. FIG. 2 is a block diagram 30 of an acoustic receiver for underwater digital communications. Acoustic communications receiver 30 can include a sensor 32, a sensor beamformer 34 and a processing device 36. The sensor 32 can be, for example, an array of hydrophones. The sensor beamformer 34 provides acoustic data received on sensor 32 and related acoustic data received at known bearings from sensor 32. Beamformed acoustic data can include both signals and noise. This data can originate from an acoustic projector such as transducer 12 from FIG. 1 and can arrive at sensor 32 through an underwater channel such as 22 of FIG. 1. Acoustic data can be, for example, an array of data channels that respond best to certain directions of arrival and attenuate noise arriving from other directions.

The processing device 36 is configured to detect individual incoming communication signals contained in the beamformed acoustic data. Processing device 36 can be, for example, a computer processor, a signal processor, a computer or another device that includes a computer processor.

Processing device 36 can be configured to separately filter each beam of beamformed acoustic data such that individual communication signals within the acoustic data are within a predetermined bandwidth range, a time duration range, a frequency range and time separation range. Filtering the individual communication signals may include measuring the number of signals at discrete frequencies found in each of the individual communication signals, and measuring a time separation between the start of signals at each frequency. Filtering can also compare a number of the individual communication signals with a predefined expected number of individual communication signals. Filtering can further be performed by choosing detection parameters that support a processing gain required for particular sender/receiver geometries. Frequencies of the individual communication signals can be measured or estimated. (Estimation could be necessary because of frequency changes that can occur because of the Doppler effect when sources and/or receivers are in motion. In the case when more than the expected number of individual communication signals are detected within a certain time window, the decoding process is based on the evaluation of all combinations of the plurality of individual communication signals and comparison of symbol sets associated with the detected signals to a codebook of messages. Examples of the predetermined symbols may include hexadecimal symbols, numeric sequences, letters of the English alphabet, and symbols or characters of other languages or cryptographic systems.

When the number of symbols associated with detected signals exceeds an expected amount within a specified time period, all combinations of the symbols may be compared to a codebook of symbol sets to identify the message with the highest similarity score. The similarity score may be calculated based on a similarity of the bandwidth, frequency, duration and start time separation of the detected signals, to values expected for the predetermined symbols in the codebook. A symbol sequence with a highest similarity score may be selected as the decoded message corresponding to the received communication signals. In addition, an optional parity value can be transmitted, received and used to validate correct reception of the individual communication signals by comparing the parity value frequency with an expected frequency determined by the message portion of the communication signals.

FIG. 3 is a high-level flowchart 40 of processing performed by the processing device 36 of FIG. 1. Sensor array beams 38 are provided from the sensor array beamformer 34. Step 42 includes processing the incoming individual communication signals with pre-detection logic. The pre-detection logic processing 42 can include currently available detection algorithms. The specific pre-detection steps used for this invention are described more fully with reference to FIG. 4, below. Step 44 includes further processing of the signal in post-detection and termination logic that is further described with reference to FIG. 5, below. Step 46 includes performing event clustering. The event clustering step 46 is further described with reference to FIG. 6, below. A final step 48 includes performing message decoding and clutter rejection to select the best potential possibilities for decoding the incoming signals. Further description of post-detection logic and message decoding 48 is described in FIG. 7.

Figure 4:
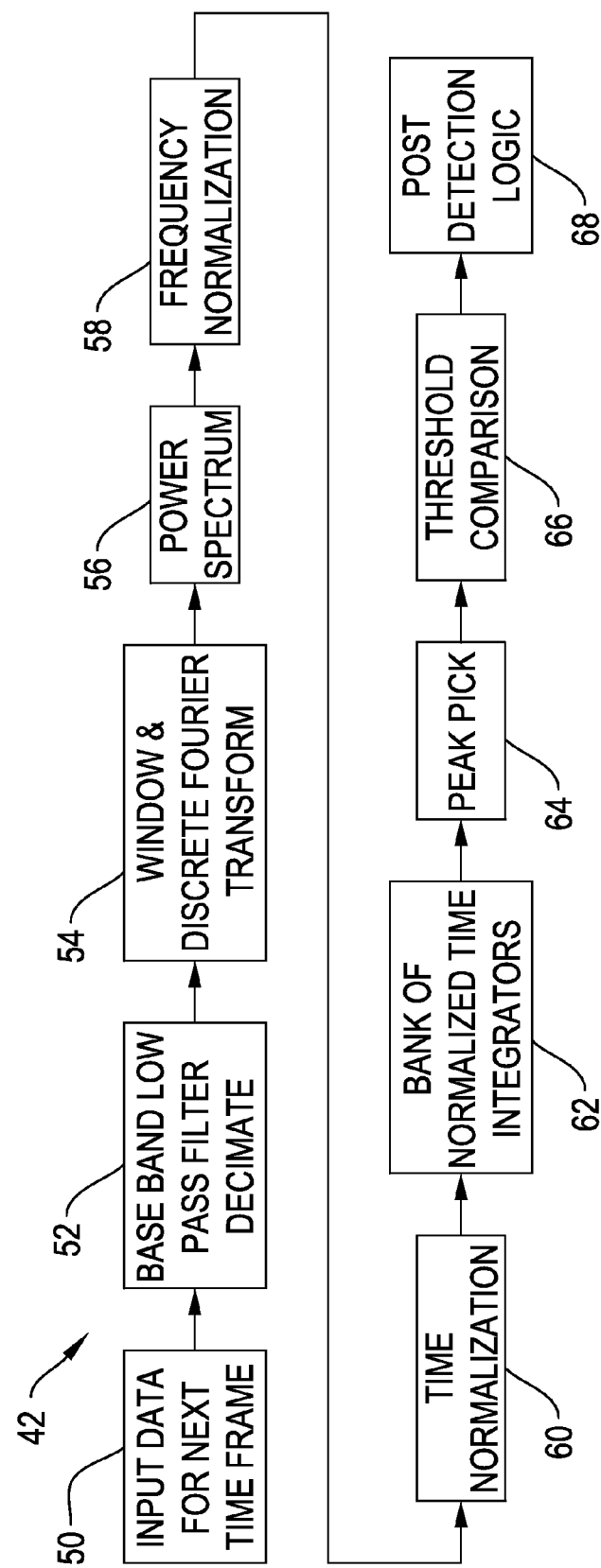
FIG. 4 is a block diagram of the initial signal processing and pre-detection logic from FIG. 3 in further detail.

FIG. 4 is a block diagram of the initial signal processing and pre-detection logic 42 from FIG. 2. The purpose of the predetection processing is to detect the onset of individual narrowband transient signals when the start time, receive frequency, and duration are unknown a priori. For normal digital communication conditions, transmit times are asynchronous, frequency is variable because of motion induced Doppler, and pulse durations are impacted by the superposition of multipath arrivals. The input to the algorithm is either a single or a multichannel time series from an omnidirectional sensor or a beamformed array, respectively. Pre-detection logic 42 begins at step 50 with receiving beamformed acoustic data having individual communication signals for a time frame of interest. Step 52 includes base banding, filtering, and decimating the input individual communication signals to match the band of a transmitting signal and reduce a computational load.

In more particular detail, the first stage is signal processing and predetection logic. The input time series data are partitioned into frames represented by $\underline{t}_n$, as shown in equation (1a):

$$\underline{t}n = \{t_1, t_2, \ldots, t_N\}_n, \tag{1a}$$

where $t_i$=discrete digital samples from a sensor; i=time index within a frame $[0, 1, 2, \ldots, N-1]$; N=number of time samples in each input frame; n=chronological index of time series vectors.

The input data are band-shifted, filtered, and decimated to match the band of the transmit sequence and reduce the computational load. Thus, $$t'_i = t_i \cdot e^{-j2\pi \frac{f_o}{f_s} i}, \text{ and } \underline{t}' = \{t'_1, t'_2, \ldots, t'_N\}, \tag{1b}$$

where j=square root of $-1$; $f_o$=center frequency of the translated band; $f_s$=original sampling frequency input to the receiver. The resultant $\underline{t}'$ vector is complex.

Then, the infinite impulse response (IIR) filter is applied per equation (1c), resulting in the vector of the bandpass filtered complex time series in equation (1d).

$$t''_i = \frac{1}{a_1}\left[\sum_{q=1}^{Q} b_q t'_{i-q+1} - \sum_{m=2}^{M} a_m t''_{i-m+1}\right], \tag{1c}$$

where $\underline{a}=[a_1, a_2, \ldots a_M]$=autoregressive filter coefficients; M=number of autoregressive coefficients; $\underline{b}=[b_1, b_2, \ldots, B_Q]$=moving average filter coefficients; Q=number of moving average coefficients. Hence, $$\underline{t}'' = \{t''_1, t''_2, \ldots, t''_N\}. \tag{1d}$$

After filtering, the decimated data vector $\underline{u}_n$ is formed as $$\underline{u}_n = \{t''_1, t''_{DS+1}, \ldots, t''_{2DS+1}, \ldots, t''_{L \cdot DS+1}\}_n = \{u_1, u_2, \ldots, u_L\}_n, \tag{1e}$$

where $$DS = \text{round}\left[\frac{f_s}{f_{s2}}\right], \tag{1f}$$

where round( ) is the arithmetic operator resulting in the nearest integer; $f_{s2}$=new sampling frequency after decimation; L=length of decimated data vector=round(N/DS). For example, if $f_s$=2000, and $f_{s2}$=100, then DS=20.

Next, in step 54, the time series data frames $\underline{u}_n$ are overlapped, windowed, and Fourier transformed as $$\underline{v}_n = \{v_1, v_2, \ldots, v_{N_s}\}_n, v_i = \sum_{k=1}^{N_F} \tilde{w}_k \cdot \tilde{u}_k \cdot e^{-j\frac{2N}{N_F}(k-1)(i-1)}, \tag{2}$$

where $N_F$=discrete Fourier transform size, and $$\tilde{w}_i = 0.54 - 0.46 \cdot \cos\left(\frac{2\pi \cdot i}{(N_F - 1)}\right),$$

for a Hamming window. (3)

The variables $\tilde{u}_i$ represent the input data after arranging to provide a specified window overlap. For example, if $N_F$=512, and L=220, and the desired overlap ratio is 0.57, then $$\underline{\tilde{u}}_n = \{\tilde{u}_1, \tilde{u}_2, \ldots, \tilde{u}_{N_s}\}_n = [\{u_{L-r+1}, u_{L-r+2}, \ldots, u_L\}_{n-2}, \underline{u}_{n-1}, \underline{u}_n]_n, \tag{4}$$

where the variables in brackets { } represent the last part of $\underline{u}_{n-2}$, and $r=N_F-2L$. Next, in step 56, the power of the complex spectrum $v_i$ is computed in accordance with equation (5). Here, we modified the meaning of the sample index i to represent frequency bins instead of time samples.

$$p_i = |v_i|^2, i = n_s, n_s+1, \ldots, n_e, \text{ and } \underline{p}_n = \{p_{n_s}, p_{n_s+1}, \ldots, p_{n_e}\}_n, \tag{5}$$

where $n_s$=start spectral bin to process, and $n_e$=end spectral bin to process.

The short-time power spectra $\underline{p}_n$ are then preferably normalized by a split-window, two-pass mean estimate of the noise background across frequency. The process begins in step 58 by compensating for edge effects by creating a new vector that contains the original sequence plus additional data samples appended to the beginning and end of the original vector. The appended data are effectively a circularly wrapped version of the original $\underline{p}_n$. The new vector is defined as $$\underline{\tilde{p}}_n = \{\underline{p}_s; \underline{p}_n; \underline{p}_e\} = \{\tilde{p}_1, \tilde{p}_2, \ldots, \tilde{p}_{2(K+g)+n_b}\}_n, \tag{6a}$$

where $$\underline{p}_e = \{p_{n_s+1}, p_{n_s+2}, \ldots, p_{n_s+K+g}\}_n \tag{6b}$$

$$\underline{p}_s = \{p_{n_e-K-g+1}, p_{n_e-K-g+2}, \ldots, p_{n_e}\}_n. \tag{6c}$$

The background estimate is computed as follows:

$$\mu'_i = \frac{1}{2K}\sum_{k=1}^{K}(\tilde{p}_{i-k-g} + \tilde{p}_{i+k+g}), \tag{7}$$

where K=size of the right- or left-side averaging window; g=one-half of the gap size (within the split window); $\mu'_i$ is the first-pass mean of the spectrum at bin i;

$$p'_i = \begin{cases} p_{i+n_s}, & \text{if } p_{i+n_s} < T_S \cdot \mu'_i \\ \mu'_i, & \text{if } p_{i+n_s} \geq T_S \cdot \mu'_i \end{cases}; \text{ and} \tag{8}$$

$T_s$ is the shearing threshold. Prior to computing a second-pass mean, circular wrapping is again performed to minimize edge effects. A new truncated vector is defined as $$\underline{p}''_n = \{\underline{p}'_s ; \underline{p}'_n ; \underline{p}'_e\} = \{p''_1, p''_2, \ldots, p''_{2K+n_b}\}_n, \quad (9a)$$

where $$\underline{p}'_n = \{p'_1, p'_2, \ldots, p'_{n_b}\}_n, \quad (9b)$$

$$\underline{p}'_e = \{p'_1, p'_2, \ldots, p'_K\}_n, \quad (9c)$$

$$\underline{p}'_s = \{p_{n_b-K+1}, p_{n_b-K+2}, \ldots, p_{n_b}\}_n, \quad (9d)$$

Equation (10) gives a second-pass mean across the spectrum:

$$\mu_i = \frac{1}{2K} \sum_{k=1}^{K} (p''_{i-k} + p''_{i+k}), \quad (10)$$

where $\underline{\mu}_n = \{\mu_1, \mu_2, \ldots, \mu_n\}_n$, and $n_b = n_e - n_s$.

Notice that there is not a gap in the integration window on the second pass (i.e., g=0), because any significant bias from signals was presumably minimized by truncation after the first pass. Also, the truncation performed after applying the shearing threshold test in the first pass creates a multiplicative bias in the noise estimate. This can be corrected by multiplying the u vector by a correction term, known in the prior art, as shown in equation (11):

$$b = 1.0 - T_s \cdot e^{(-T_s)}. \quad (11a)$$

$$\underline{\mu}_n = \underline{\mu}_n / b. \quad (11b)$$

A normalized version of the power spectrum is then created as $$x_i = \frac{p_{i+n_s}}{\mu_i}, \; x_n = \{x_1, x_2, \ldots, x_{n_b}\}_n. \quad (12)$$

Next, in step 60, a second stage of normalization is performed with an estimate of the long-term average of the background noise. To avoid contamination of the long-term background by yet undetected signal energy, the first-stage spectral frames are stored in a ring buffer. Specifically, $$x_n = \begin{cases} \{x_1, x_2, \ldots, x_{n_b}\}_{n-2} \\ \{x_1, x_2, \ldots, x_{n_b}\}_{n-1} \\ \{x_1, x_2, \ldots, x_{n_b}\}_n \end{cases}. \quad (13)$$

The individual elements of the $x_n$ matrix are defined as $x_{i,n}$, where i is the frequency bin index and n is the time index.

With the above notation, the long-term averaged noise background estimate is computed using the delayed power series data as represented in equation (14):

$$y_{i,n} = (1-\alpha) x_{i-2,n} + \alpha \cdot y_{i,n-1}, \quad (14)$$

where $y_{i,n}$ is the background noise spectrum in the $i^{th}$ frequency bin at the $(n-1)^{th}$ time update, $x_{i,n-2}$ is the normalized (in frequency) power spectrum in the $i^{th}$ frequency bin at the $(n-2)^{th}$ time update, and a is the noise-averaging smoothing coefficient (e.g., 0.995).

It is assumed that the noise background is unknown and can change slowly with time. The value of $\alpha$ in equation (14) can range from 0 to 1. A larger value for $\alpha$ reduces the asymptotic variance of the noise background estimate but has the deleterious effect of slowing adaptation to a changing background. Therefore, the value for $\alpha$ should be chosen to represent a compromise between these factors. The coefficient $\alpha$ can be defined by its desired time constant $\tau$. This time constant is analogous to the time it takes a single-pole, resistive-capacitive filter to decay to 1/e of its value when stimulated with an impulse of unity amplitude. The relationship between the time constant and the normalizer coefficient is defined by $\tau = -1/\ln(\alpha)$. Finally, the default delay for noise estimation is two frames because any signal loud enough to affect the background estimate will presumably be detected in at least two frames. Equation (14) is initiated at system startup by setting the first estimate equal to the sample mean of the first several frames.

After a noise background estimate is obtained, an incremental detection statistic is computed by a second-stage normalization, mean removal, and negative clipping, as shown in equations (15a) and (15b):

$$z'_i = \frac{x_i}{w_i} - 1, \; z'_n = \{z'_1, z'_2, \ldots, z'_{n_b}\}_n. \quad (15a)$$

$$z_i = \begin{cases} z'_i, & z'_i > 0 \\ 0 & \text{otherwise}, \end{cases} \; z_n = \{z_1, z_2, \ldots, z_{n_b}\}_n. \quad (15b)$$

where, again, $i = 1, 2, \ldots, n_b$ is the index of the spectral bin, and $w_i$ is a "version" of the long-term background estimate defined in equation (16). The variable $n_b$ is the total number of spectral bins to process for detection.

The normalization factor (denominator) in equation (15a) is a bin-by-bin copy of the long-term background estimate $\underline{y}_n$ except when a bin is in the process of being detected, i.e., its detection statistic is above the threshold. Specifically, $$w_i = \begin{cases} y_i, & P_{i,n} < T \\ w_i, & \text{otherwise} \end{cases}. \quad (16)$$

This logic freezes the background estimate when a signal is present (by virtue of its detection statistic meeting the required criteria), thereby minimizing contamination of the detection statistic by signal energy.

A maximum likelihood detector of a constant amplitude monochromatic signal with an unknown receive frequency and an unknown duration in a Gaussian noise background can be approximated by concurrently processing the parallel outputs of short-time Fourier power spectra followed by a bank of integrators, each normalized to a discrete domain of duration hypotheses. The Gaussian assumption is nearly true after normalization because a background estimate effectively "whitens" the measurements when signal is not present. Moreover, integration of many nearly independent data variables forces a summation to be closely Gaussian by the central limit theorem. This will occur if the transmitted signal is sufficiently long (e.g., more than 10 spectral frames). The Gaussian assumption is valid as long as the signals being detected are more than just a few spectral frames in length and the selected Fourier transform window is not too long.

With these constraints in mind, integration is performed as follows. The values in $\underline{z}_n = \{z_1, z_2, \ldots, z_n\}_n$ are referred to as the detection increments produced by sequential frame updates across all processed frequency bins. Similar to the notation used in equation (14), the individual elements in $z_n$ are also identified as $z_{i,n}$ where i is the frequency bin index and n is the running time frame index. Prior to the actual detection test, the increments are input to a bank of energy detectors matched to a successive set of increasing signal durations. The energy detectors represent normalized partial sums of the increments. The index n indicates the most recent detection increment, and (n−k+1) indicates an increment that is k frames old. Then, let the unnormalized partial sum $P'_n(i,k)$ be defined as the numerical integration of the last k detection increments relative to time frame n for each frequency bin i. This is represented by equation (17):

$$P'_n(i, k) = \sum_{t=1}^{k} z_{i,n-t+1}, \tag{17}$$

where k=1, 2, . . . , $N_{ps}$, and $N_{ps}$ is the number of partial sums. The default number of partial sums for our application is 25.

A detector formed from a bank of integrators can be implemented in step 64. Using a bank of integrators to detect temporary changes in the statistics of a Gaussian time series is known in the art. An intuitively appealing aspect of the decision logic is that it is based on recognizing when the second-order statistics of a new set of measurements have significantly changed compared with the measurement history leading up to the event. Since we have the opportunity to estimate the statistics (mean and variance) of the noise, the detector can take the form of a test that measures how many standard deviations the prospective signal energy is away from the noise After normalization, the measurements $z_i$ (from equation (15b)) are zero mean and unit variance. For any partial sum, the mean will be zero because the mean was removed in equation (15a). In the noise-only case, normalization of each partial sum k by its standard deviation $\sigma_k$ yields a simple measure of deviation from the expectation. The final set of statistics can be maximized in step 64 across a set of duration hypotheses and compared with a threshold as in step 66. A threshold exceedance indicates the onset of a signal. The specific peak location k indicates the duration of the signal so far.

Specifically, $\sigma_k$ for accumulated normalized spectral powers can be simply approximated as $$\sigma_k = \gamma \sqrt{k}. \tag{18}$$

This can be derived by realizing that the statistics of the original spectral powers can be approximated by an exponential probability distribution (i.e., $f(x) = \lambda e^{-\lambda x}$). After normalization, both the mean and the standard deviation $1/\lambda$ should be approximately unity. Because the measurements are assumed to be independent and identically distributed, the variance of the sum is the sum of their individual variances. Therefore, the standard deviation is ordinarily $\sqrt{k}$. However, in our case, the power spectra are created by overlapping and weighting the input data with a window function prior to the Fourier transform. By the convolution theorem of the Fourier transform, the window function applied in the time domain can be analogously interpreted as a local weighted average of adjacent frequency bins. This slightly reduces the variance and requires a scale factor $\gamma$ to align the model with actual data. It was found that $\gamma = 0.8$ worked best for the particular purposes of the testing.

With the standard deviations defined, the successive partial sums are normalized according to equation (19):

$$P_n(i, k) = \frac{P'_n(i, k)}{\sigma_k}. \tag{19}$$

Finally, the maximum of all of the normalized partial sums for each frequency bin is determined by equation (20a):

$$\hat{P}_n(i) = \max\{P_n(i,k)\}_{k=1}^{N_{ps}}, i+1, 2, \ldots, n_b \text{(i.e., the frequency index)}. \tag{20a}$$

Also, $$\hat{P}_n = \{\hat{P}_n(1), \hat{P}_n(2), \ldots, \hat{P}_n(n_b)\}. \tag{20b}$$

The above operations, collectively referred to as predetection processing, are performed as each new frame of time series data is acquired.

Figure 5:
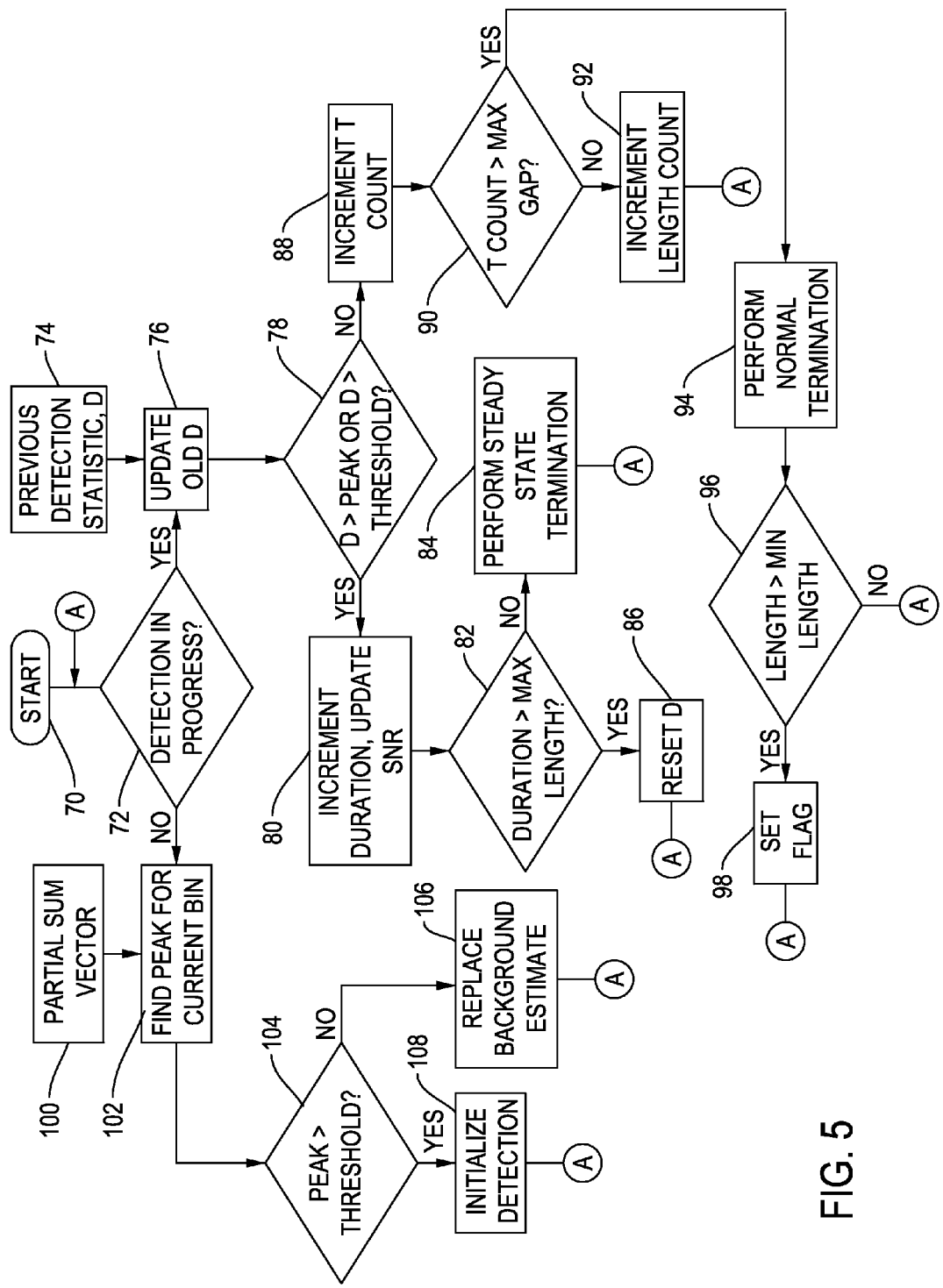
FIG. 5 is a block diagram showing post-detection logic from FIG. 3 in further detail.

FIG. 5 is a block diagram showing the post-detection logic 44 from FIG. 3. The purpose of post-detection logic 44 is to determine the time at which individual communication signals currently in a detected state are finally terminated. The post-detection processing is performed independently upon each frequency bin output from the pre-detection logic 42. Post-detection logic begins 70 by determining in step 72 if detection of a signal is in progress. If so, a detection statistic from the last processed data frame is updated in step 76 with a new detection increment computed from equations 15(a) and 15(b) in step 74. The update involves multiplying the old detection statistic times the old length, adding the new detection increment, and normalizing the sum by the length plus one.

Step 78 determines if the updated detection statistic is greater than the previous statistic, or if the received signal detection statistic is greater than a predetermined threshold. If so, a step 80 can increment the duration estimate of the signal. Step 82 determines if the duration of the signal is greater than a predetermined maximum length. If so, step 84 performs termination functions and returns to the beginning 70 of the post-detection logic 44. If the duration of the signal is not greater than the maximum length, step 86 resets an old version of the detection statistic to the newest value, and returns 70 to the beginning of the post-detection logic.

If in block 78 the normalized detection statistic is not increasing, and the signal detection statistic is not greater than a specified threshold, then a step 88 increments a termination count which counts a number of terminated frames of signal data. Step 90 determines if the signal has been in a termination state for a minimum number of time frames. Step 92 increments a stored length of the signal (vector length) and returns to the start 70 of the post detection logic 44.

If at block 90, the signal has been terminated for the minimum required time, step 94 may include termination functions such as calculating the frequency value and signal to noise ratio and resetting counters. Step 96 determines whether the signal vector length is greater than a minimum value and a flag is set in step 98. Control returns to the start 70 of the post-detection logic 44.

If at step 72, detection of a signal is not in progress, step 102 finds a peak value of a partial sum vector of the signal for each frequency cell as described in equations (20a) and (20b). The partial sum vector is computed in step 100 as described in equations (19). This peak value is from FIG. 4, step 64 and step 100. Step 104 determines if a peak value is greater than a specified threshold. If not, step 106 replaces an estimate of the noise background with a value that includes the latest frame of data, and processing returns to the start 70 of the post-detection logic 44. If at step 104, the peak value of the signal is greater than a specified threshold, then step 108 sets a detection flag, a time frame starting point is initialized, a signal to noise ratio (SNR) is initialized for the frequency bin associated with the detection, and the termination count may be reset. Processing then returns to the start 70 of the post-detection logic 44. The post-detection processing is performed independently upon each frequency bin generated by the pre-detection processing 42.

Figure 6A:
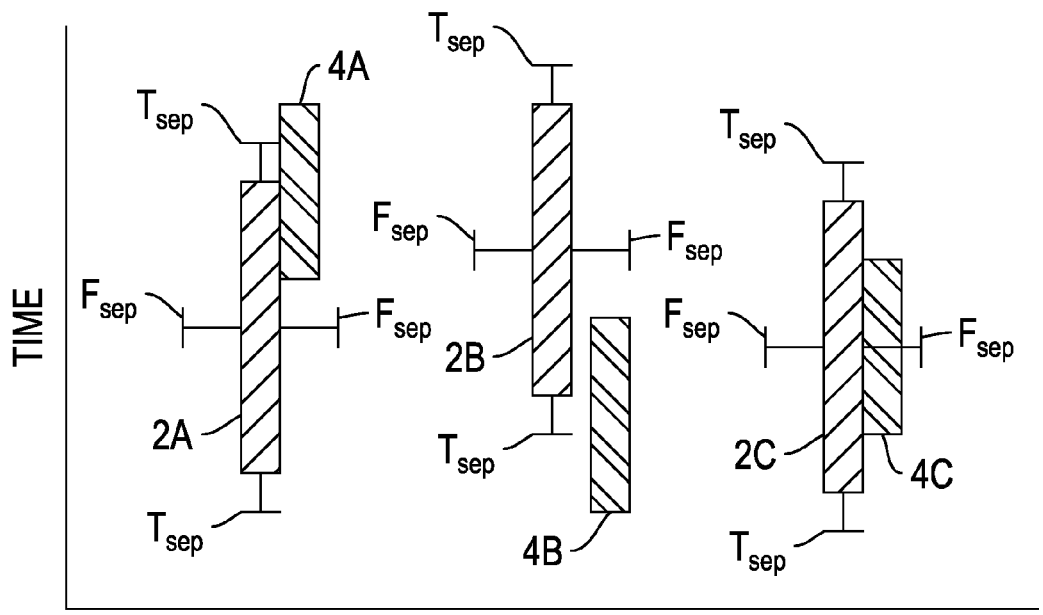
FIGS. 6A and 6B are exemplary graphs used in describing the clustering process.
Figure 6B:
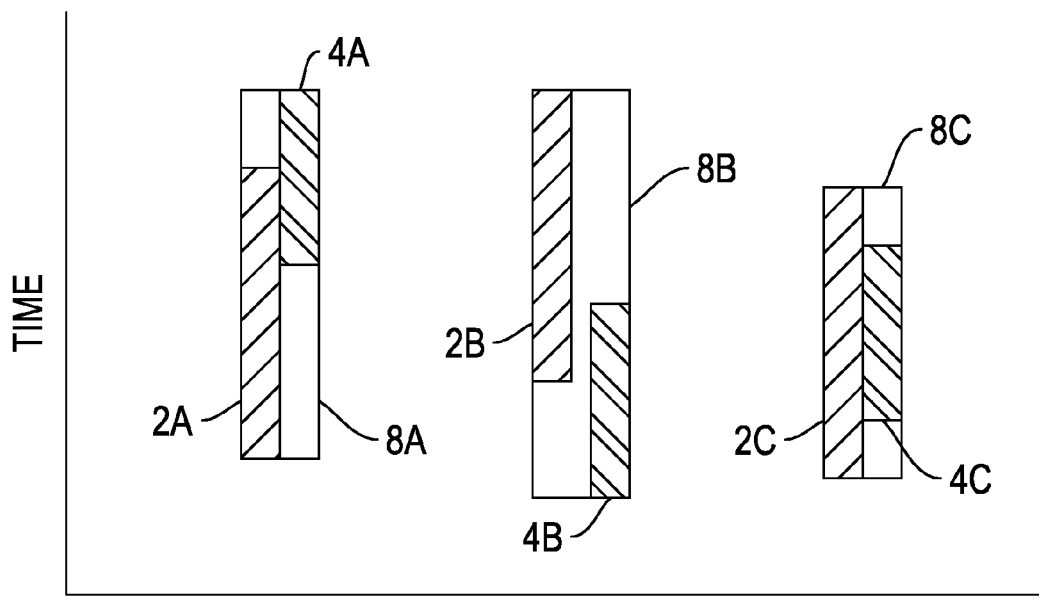

FIGS. 6A and 6B illustrate event clustering 46 by the processing device 36 of FIG. 2 according to an exemplary embodiment of the invention. Clustering combines signal detections across multiple adjacent frequency bins into a single detection cluster. For example, signal detections at neighboring time and frequency space can be combined into the same cluster as potential parts of the same signal group or message.

Clustering can also re-combine signals from different clusters into a single cluster based on similar time and frequency of the individual signals as potential parts of the same signal group or message. Re-clustering may be needed if signals similar in time and frequency have been grouped into different clusters because the signal is close in frequency to more than one cluster.

To account for these cases, a clustering algorithm is provided that receives the outputs of the detector and combines the parameters from adjacent detections (in time and frequency) into a single detection cluster. The procedure processes the detection outputs as a batch list and makes the first detection in the list a seed cluster. It then loops through all of the remaining detections in the batch to find other detections with adjacent times and frequency bins, where "adjacent" is predefined by different separation thresholds for both time and frequency. As detections are linked to a cluster, they are deleted from the active list, so that each original detection is associated with only one cluster. A separate cluster list is created that stores the global start and end points for time and frequency as well as the composite signal to noise ratio (SNR) for the clustered events. The composite SNR is the peak average SNR across the clustered detections.

In FIGS. 6A and 6B, $T_{sep}$ is the number of seconds before or beyond a cluster time boundary that is still acceptable to meet the linking criteria. $F_{sep}$ is the number of Hz to the left or the right (lower or higher frequency, respectively) that is still acceptable to meet the linking criteria. Given these parameters, the criteria for linking detections into clusters can be segmented into three situations as illustrated in FIG. 6A. In the first situation with original cluster 2A and new detection 4A, the start of the detection 2A is inside the cluster time boundaries (extended by $T_{sep}$), but the end of the detection is outside the cluster end. In the second case with original cluster 2B and new detection 4B, the end of the detection 4B is inside the cluster time boundaries (extended by $T_{sep}$), but the start of the detection 4B is outside the beginning boundary of the cluster. Finally, in the third case, cluster 2C and new detection 4C, both the start and the end of the detection 4C boundaries are inside the extended boundaries of the cluster 2C. Also, in all cases, the frequencies of the detection (in a single frequency bin) must be inside the extended start and end frequencies of the cluster. FIG. 6B shows extended boundaries 8A for cluster 2A and new detection 4A, extended boundaries 8B for cluster 2B and new detection 4B, and extended boundaries 8C for cluster 2C and new detection 4C. Extended boundaries create revised clusters.

Figure 7A:
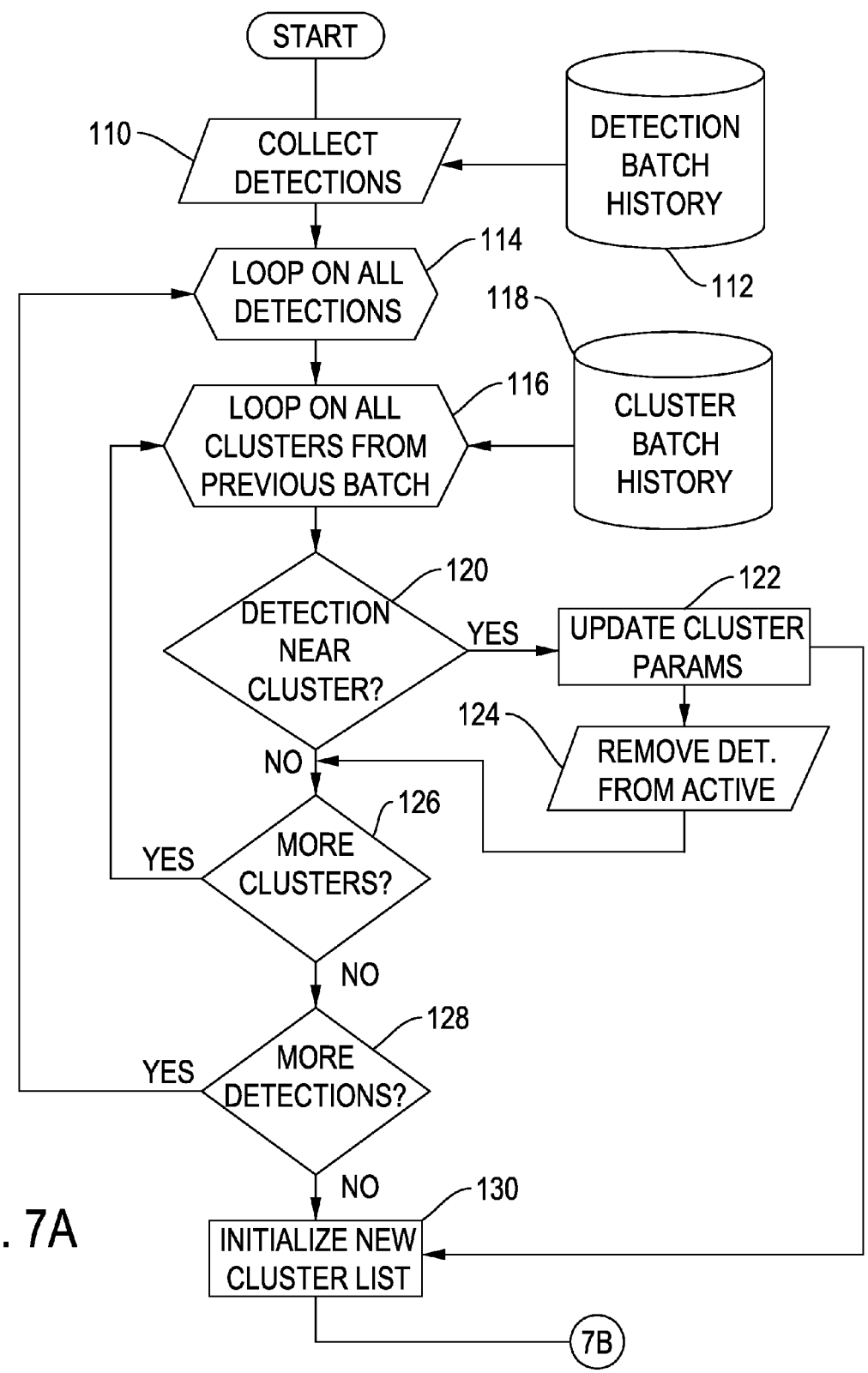
FIGS. 7A and 7B are a flowchart illustrating event clustering from FIG. 3 in further detail.
Figure 7B:
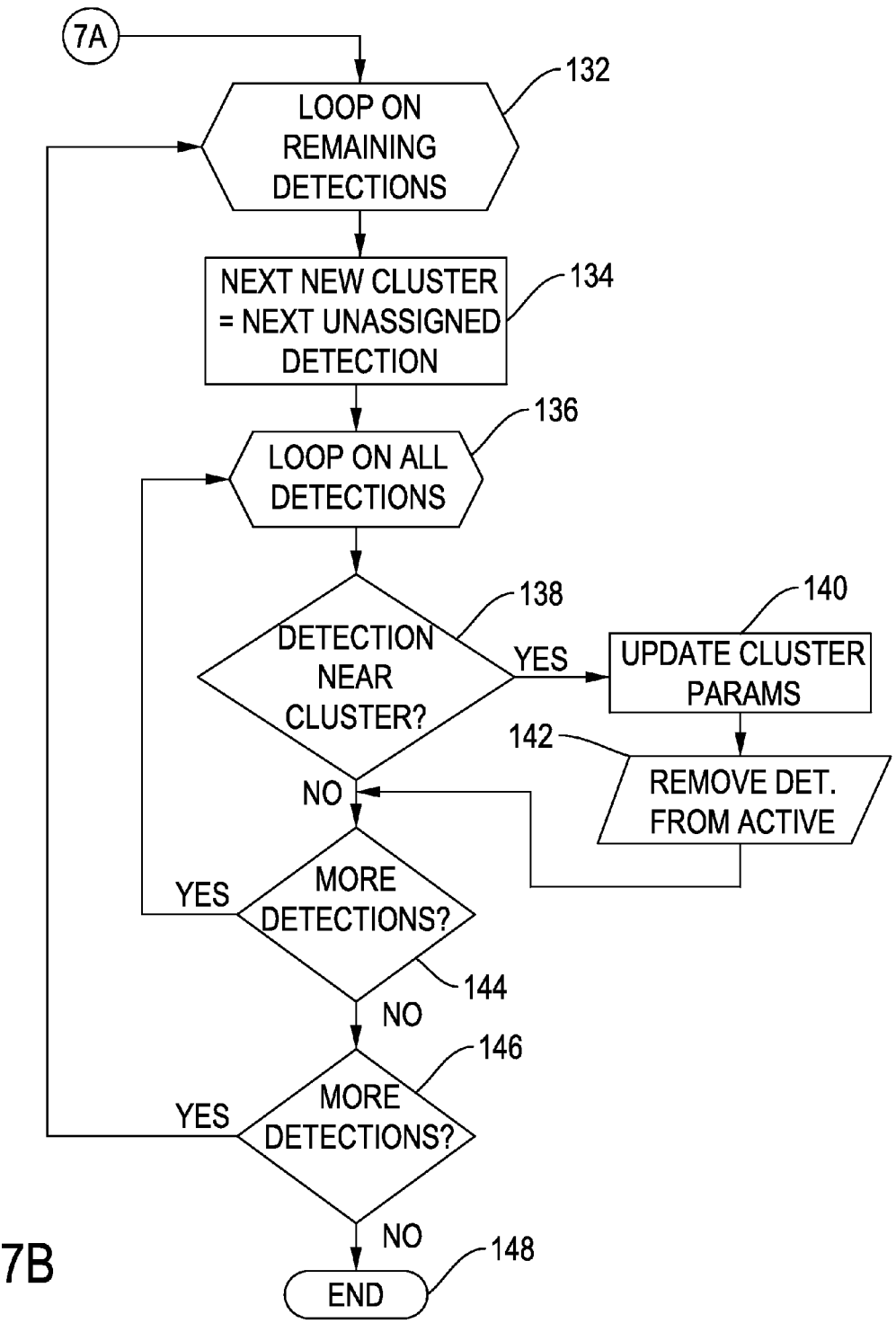

FIGS. 7A and 7B provide a flowchart illustrating the method. The flowchart portion in FIG. 7A assigns a batch of detections to existing clusters. The portion in FIG. 7B creates new clusters from detections that aren't assigned in FIG. 7A. Step 110 collects a batch of detected signal parameters from a stored detection batch history in Step 112. Step 114 loops on all signal detections in the latest batch to search for signal detections with similar frequency and similar time to previously identified clusters. Step 116 loops on all clusters from the previous batch by retrieving a cluster batch history in step 118 to search for a cluster with a similar frequency and time to an incoming signal detection.

Step 120 performs the comparison of detection parameters to existing cluster parameters. If the parameters of a cluster are found to be sufficiently "near" the parameters of a detection, step 122 updates the cluster parameters. Then the detected signal parameters are removed from the active list in step 124 so that it cannot influence another cluster. If a detection is not near the current cluster, step 126 includes checking the other previously established clusters. If there are more clusters, processing returns to step 116. If no more clusters are available, step 128 checks for more detections in an incoming batch of signal detections. If more detections are found, processing returns to step 114. If no more detections are found, step 130 initializes a new cluster list that includes all current clusters, and any newly updated clusters of signal detections.

Referring now to FIG. 7B, clusters can be created from remaining signal detections. These remaining signal detections are the detections that weren't matched with pre-existing clusters. Step 132 loops on remaining signal detections. Step 134 sets a next new cluster to correspond to a next unassigned signal detection. Step 136 loops through the other remaining unassigned signal detections to determine if these signal detections should be assigned to the new cluster.

Step 138 determines if the detection is similar in frequency and signal detection time to the new cluster. If the detection is near the cluster, step 140 updates cluster parameters with the associated detection parameters, and removes the detected signal parameters from an active list of detections in step 142. If a detection isn't near the new cluster, step 144 checks the remainder of the unassigned signal detections. If more unassigned signal detections are found, processing returns to step 136. Once all of the remaining unassigned signal detections have been tested against the new cluster, step 146 checks again for more unassigned signal detections to create additional new clusters. If more unassigned signal detections are found, processing returns to step 132. If no more unassigned signal detections are found, step 148 provides a new cluster list as output that incorporates all the input batch of detections.

Groups of clustered detections are next provided to a decoder that searches for patterns corresponding to one of the discrete transmit sequences listed in a codebook. The codebook is simply the list of permutations (ordered combinations with repetition) of the number of states transmitted multiplied by the number of bits in a message.

The primary purpose of the decoder logic is to identify a sequence of detected pulses that matches one of the messages in a predefined codebook. A secondary purpose is to minimize the impact of detected clutter on the decoder accuracy. Time and frequency-oriented background cancellation provides inherent robustness to clutter, but it is possible for other signals to be received with durations and bandwidth characteristics that are similar to the transmitted waveforms. If these signals are detected within the receive band of the communications pulses, it is possible for the message to be misread. However, the logic described below attempts to deal with this possibility.

The decoder function begins by collecting the parameters from a group of clusters into a batch. The number of clusters is governed by a time constraint. Typically, this time constraint is about 30 seconds greater than the duration of the transmit sequence, which accounts for possible latencies in the detector due to integration times. The cluster history buffer is defined as $$H = \left\{ \begin{matrix} t_{s1} & t_{e1} & f_{s1} & f_{e1} & snr_1 \\ \cdot & \cdot & \cdot & \cdot & \cdot \\ t_{si} & t_{ei} & f_{si} & f_{ei} & snr_{1i} \end{matrix} \right\} i = 1, 2, 3, \ldots, N_h \quad (21)$$

where
- $t_{si}$=start time of cluster i
- $t_{ei}$=end time of cluster i
- $f_{si}$=start frequency of cluster i
- $f_{ei}$=end frequency of cluster i
- $snr_i$=SNR of cluster i
- $N_h$=number of clusters in batch to evaluate.

To address the concern that the list of clusters might be greater than the number expected for a particular communication mode (determined by the number of bits and the parity option), the decoding is performed in two steps. In the first step, entries in the H matrix are collected in groups of size $S_G$ as determined by the transmit parameters, according to equation (22):

$$S_G = \begin{cases} N_B, & \text{no parity} \\ N_B + 1, & \text{with parity} \end{cases} \quad (22)$$

The number of groups is defined by the well-known combination identity given by equation (23):

$$N_G = \binom{N_h}{S_G} = \frac{N_h!}{(N_h - S_G)! \cdot S_G!}. \quad (23)$$

Then, a second-step decoder is applied to each combination of cluster parameters contained in the history buffer. The parameters of each cluster (e.g., duration, start time, frequency, and bandwidth) are compared with predefined tolerances, including a requirement (if enabled) that the data bit state locations modulo sum to a parity bit value. As the various comparisons are being made, a heuristic similarity score is computed to assess the closeness of the cluster group parameters to expectations. In the rare case that more than one cluster group satisfies all the decoding conditions, the logic will select the option with the highest similarity score.

Figure 8A:
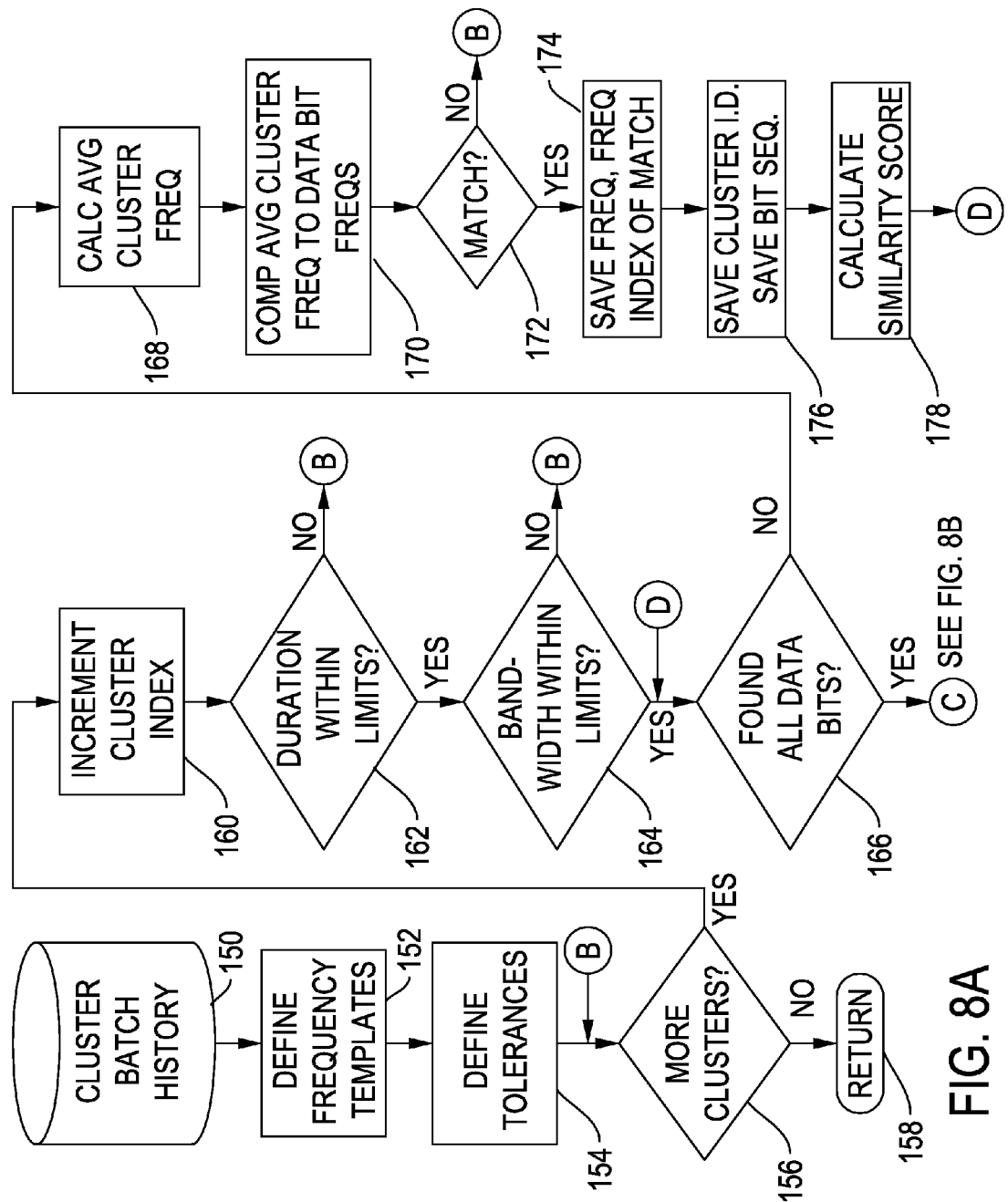
FIGS. 8A and 8B are a flowchart showing message decoding from FIG. 3 in further detail.
Figure 8B:
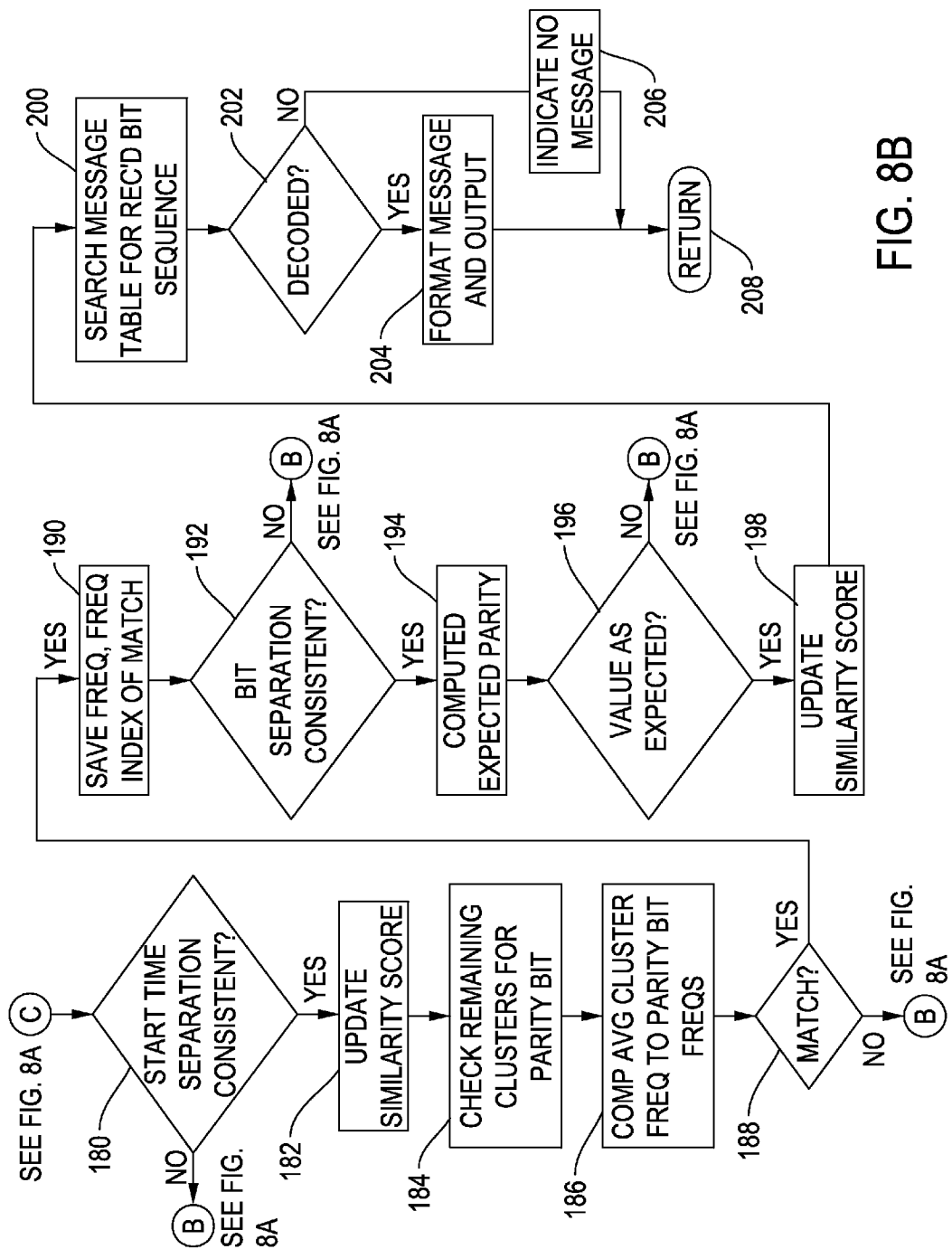

A diagram of the second step in the decoder is given in FIGS. 8A and 8B. From this point on, the batch history refers to the subset of clusters selected from the original batch. The comparison logic first defines the following parameters:

$$\underline{f}_a = \{f_{a1}, f_{a2}, \ldots, f_{aN_s}\}, \quad (24a)$$

and $$\underline{f}_p = \{f_{p1}, f_{p2}, \ldots, f_{pN}\}, \quad (24b)$$

where $N_s$=number of states as defined above.

Equation (24a) gives the set of frequencies associated with the cluster group. Equation (24b) gives the frequency set associated with the parity bit. The parity bit is represented by another pulse following the data bit pulses with a frequency that is also quantized to a discrete set of states. The value of the parity bit frequency gives the decoder a method of validating correct reception of the message sequence. The number of possible parity state frequencies is equal to the number of message bit frequencies. However, the values of parity bit frequencies are offset from the message bit frequencies so that the last message bit cannot end next to the start of the parity bit. In our case, $$f_{pi} = f_{ai} + \Delta f_p, i=1,2,\ldots,N_s, \quad (25)$$

where $$\Delta f_p = \frac{f_{p2} - f_{p1}}{2}. \quad (26)$$

Other operating parameters include the following:
$T_c$=duration of a single transmitted message pulse,
$\Delta t$=maximum deviation between measured and expected pulse duration $T_c$,
$\Delta t'$=maximum deviation between measured start of one pulse and start of next,
$\Delta f = (f_{a2} - f_{a1})/3$=maximum deviation between measured frequency of the pulse and its expectation from either $\underline{f}_a$ or $\underline{f}_p$,
$bw_{max}$=maximum bandwidth of a measured pulse.

As illustrated in FIGS. 8A and 8B, the decoder logic loops on all clusters contained in the input cluster set. Each cluster is first checked against the duration and bandwidth criteria. Clusters that do not meet these constraints are removed from further consideration. Specifically, $T_{dur} = t_{ei} - t_{si}$ is the duration of the next cluster i where $t_{ei}$ and $t_{si}$ are defined by equation (21). Then, the only clusters kept are those where $|T_{dur} - T_c| \leq \Delta t$. Also, $bw_s = f_{ei} - f_{si}$ is defined using equation (21), and the only clusters kept are those where $bw_s \leq bw_{max}$. Next, the frequency of a cluster is checked against the $N_S$ bit state possibilities. First, $\bar{f} = (f_{ei} + f_{si})$ defined as the average frequency of the cluster. Then, the clusters are identified that match one of the state frequencies within a specified tolerance. Specifically, the decoder finds the index k, where $|\bar{f} - f_{ak}| \leq \Delta f$ and k=1, 2, ..., $N_B$, and begins counting the number of matches identified throughout the batch of input clusters. The decoder also saves the index in a vector identifying the bit sequence.

If a matched cluster is not the first in the sequence, the time separation between the start of the most recently matched cluster and the start of the previously matched cluster is checked to determine whether this separation is less than the tolerance $\Delta t'$. If this condition is satisfied, the index k representing the matched frequency state is stored in a running list as $b_{cc}=k$, where cc is the location in the bit sequence. Clusters in the batch history will continue to be evaluated until the number of expected bits is found, i.e., $cc=N_B$.

When the data bit pulses have been identified, the remaining clusters are checked against the parity expectation. Specifically, this check requires that $|\bar{f} - f_{pk}| \leq \Delta f$, where k'=1, 2, ..., NS. If the remaining cluster satisfies the frequency check, it is again verified that the time separation between the start of the parity bit cluster and the start of the last data bit cluster is less than the tolerance $\Delta t'$. If this condition is satisfied, the frequency index of the parity bit k' is checked to verify that it is the modulo sum of the data bit frequency indexes. Specifically, let $$PV = \text{mod}\left(\sum_{i=1}^{N_B} b_i, N_B\right). \quad (27)$$

If parity is satisfied, i.e., PV=k', the decoded bit sequence is compared with the codebook table. The entry in the codebook is the output message number. If none of the codebook entries match, "−1" is output to indicate decode failure. Also, "−1" is output if the parity check fails.

As also shown in FIGS. 8A and 8B, while the various parametric conditions are being validated, a numeric similarity score is produced according to equation (28), below:

$$D_S = \begin{cases} K\left[\dfrac{\Delta t}{|T_{dur} - T_c|} + \dfrac{bw_{max}}{bw_S} + \dfrac{\Delta f}{|\bar{f} - f_{ck}|}\right], & (a) \\ \dfrac{3}{2}D_S, & (b) \\ 2D_S, & (c) \end{cases} \quad (28)$$

where
(a) is applied after satisfaction of duration, bandwidth, and frequency state conditions,
(b) is applied after satisfaction of the time separation criteria, and
(c) is applied after satisfaction of the parity criterion.

A separate $D_S$ score is computed for each cluster group interrogated by the decoder. The bit sequence selected for comparison with the codebook is the one with the highest score, for cases where more than one sequence satisfies all of the other criteria.

FIGS. 8A and 8B illustrate message decoding as a part of the post detection logic in 68 of FIG. 4 to be executed by the processing device 36 of FIG. 2. A cluster batch history 150 that stores information with respect to previous received signals can be retrieved and step 152 defines allowable frequency templates for signal detection. Step 154 defines acceptable tolerances for the signal, such as a signal frequency being within a predetermined frequency threshold or a signal duration being within a predetermined time duration threshold.

Beginning at step 156, a cluster group is assembled from received clusters. This cluster group can be the data bits of a message. Step 156 checks for additional clusters to add to the cluster group. If more clusters of signals are not received, then processing returns in step 158 to the beginning of processing of the signals, step 42. If more clusters of signals are received, step 160 increments a cluster index which specifies the number of clusters received.

Step 162 determines if the cluster index meets duration limits. For example clusters of signals that last less than a specified time limit are determined not to be acceptable signals. If the cluster index does not meet duration limits, processing returns to the beginning of the message decoding, step 156. Step 164 determines if the signal meets bandwidth limits, such as for example, an unstable signal with changing frequency over time resulting in an excessive bandwidth. If not, processing returns to step 156.

If the signal meets bandwidth limits, step 166 determines if all data bits in the cluster group for an expected signal sequence are found. If all the data bits in the signal are not found, step 168 calculates an average frequency of the cluster. Step 170 checks an average cluster frequency against all allowable data bit frequencies. In step 172, if the average cluster frequency is outside the boundaries of all of the data bit frequencies, processing can return to step 156. If the comparison 172 of the average cluster frequency is within the boundaries of a data bit frequency, then step 174 saves a frequency of a data cluster that has been matched with one of the expected signal frequencies.

Step 176 saves a cluster identifier and saving the bit number of the message sequence detected so far. Step 178 calculates an initial similarity score that represents how similar the data cluster frequency parameter is to the expected values of a possible message, and returns to step 166 to determine if all data bits in a received data cluster group are found. If all data bits are found at step 166, a step 180 checks that each signal start time in the message sequence is separated by the expected amount. If any of the start time differences in the sequence are outside required bounds the process will return to step 156. If the start time differences are all within acceptable bounds, the similarity score is further updated in step 182 to represent how similar the measured start time differences of clusters are to expectations.

Step 184 checks the remaining clusters for a parity bit. The parity bit can have a specific expected frequency that is based upon the modulo summation of all frequencies of the data bit frequencies. The value of the parity bit frequency gives the decoder a method of validating correct reception of the message sequence. The value of a parity bit frequency is offset from frequencies in the data bit signals to minimize interference from multipath arrivals. A detected cluster group that arrives after the data bit signals with the proper start time difference and other expected signal characteristics such as duration and bandwidth is a candidate parity bit. The signal sequence is accepted if the frequency of a parity bit matches the value expected by modulo summing the indexes of data bit frequencies. In this way, the parity bit may validate correct reception of the cluster group.

Step 186 checks an average frequency of signals in a candidate parity bit cluster against all the allowed parity bit frequencies. Step 188 returns to step 156 if the candidate parity bit cluster does not match any expectations.

Otherwise step 190 saves a frequency and frequency index of the cluster identified as the parity bit. Step 192 checks if the difference between the parity bit cluster start time and the last data bit cluster group start is within the specified time difference bounds. If not, control is transferred to step 156. If so, then step 194 computes an expected parity bit value may be stored in a buffer memory. Step 196 determines if the parity bit value corresponds to a value expected from the modulo sum of frequency indexes of the data bits. If so, then a step 196 returns to the message decoding logic at step 156. If the parity bit value equals the expected value, then step 198 updates a similarity score which previously represented similarity of frequency and start time values of the clusters in the cluster group.

After assembly of the cluster group, the group must be translated into a symbol. In step 200, a message table is searched for a symbol similar to a received bit sequence or cluster group. Step 202 checks to see if a message has been completely decoded. If so, a message may be formatted and output in step 204. In step 206, a flag may be set indicating that the message has not been decoded, and processing can return to the beginning of the pre-detection logic 42.

It should be understood, of course, that the foregoing relates to preferred embodiments of the invention and that modifications may be made without departing from the spirit and scope of the invention as set forth in the following claims.

What is claimed is:

1. A system for receiving communications signals coded at transmission in a frequency hopping signal wherein the frequency hopping signal represents a predetermined message, the system providing a decoded message, comprising:
   a sensor configured to receive acoustic data including plurality of individual sequential signals and environmental noise;
   a codebook capable of being programmed in a computer processor having a plurality of combinations of symbols, each corresponding to one of a plurality of predetermined messages;
   a detector joined to said sensor for developing a background noise estimate from the environmental noise, and determining when one of the plurality of communications signals has been received, said detector further comprising:
   a filter joined to receive acoustic data and to provide a filtered signal having undesirable frequencies removed and conditioned for processing;
   a transformer joined to receive the filtered signal and capable of transforming the filtered signal into a frequency domain signal;
   a power spectrum analyzer joined to said transformer for calculating power levels of frequencies in the frequency domain signal;
   frequency normalization logic joined to the power spectrum analyzer capable of calculating a frequency normalized background estimate;
   time normalization logic joined to the power spectrum analyzer and frequency normalization logic, said time normalization logic being capable of calculating a normalized background estimate from frequency normalized estimates provided over time by said frequency normalization logic;
   a bank of normalized time integrators joined to the time normalization logic, each normalized time integrator providing an integrator output indicating the variation of the power level of a group of frequencies from the normalized background noise estimate;
   a peak picker joined to said bank of normalized time integrators capable of providing the largest variation of the group of frequency power levels; and
   threshold comparison logic joined the peak picker to receive the largest variation of the group of frequency power levels, said threshold comparison logic capable of indicating a detection when the largest variation exceeds a preset number of standard deviations from the normalized background noise estimate;
   signal termination logic joined to said detector for receiving detected signals, adjusting the background noise estimate, and determining when said detected signal terminates;
   a cluster processor joined to said signal termination logic for grouping the detected signals into clusters based on transmission time, duration, and frequency;
   a message processor joined to said cluster processor for receiving clusters and being capable of processing clusters into a combination of symbols, said message processor having said codebook programmed therein and being capable of processing the combination of symbols into the predetermined message; and
   an output means joined to the message processor for providing the predetermined message as the decoded message.

2. The system of claim 1 wherein said cluster processor comprises:
   a detection storage capable of storing unmatched detections;
   a cluster storage capable of storing existing clusters of matched detections; and
   cluster logic capable of receiving detected signals and comparing received detected signals against stored detections and existing clusters to determine if said received detected signals can be assigned to one of a new cluster and an existing cluster.

3. The system of claim 1 wherein said message processor comprises:
   a cluster storage capable of storing clusters of matched detections;
   a template processor joined to said cluster storage capable of determining if stored clusters are within predetermined frequency tolerances and signal durations;
   a symbol assembly processor joined to said template processor capable of assembling clusters into combinations of symbols;
   symbol comparison logic joined to said symbol assembly processor capable of matching combinations of symbols with the predetermined message from the codebook.

4. The system of claim 3 wherein said message processor further comprises a parity processor capable of processing stored clusters into parity data and comparing the parity data against the combination of symbols to provide a determination of validity, said symbol assembly processor rejecting said combination of symbols without the determination of validity.

5. A method for receiving frequency hopped communications signals wherein the frequency hopped communications signal represents a predetermined message, and the method provides a decoded message, said method comprising the steps of:
   receiving acoustic data including a plurality of frequency hopped communications signals and environmental noise;
   establishing a codebook in a computer processor having a plurality of combinations of symbols, each corresponding to one of a plurality of predetermined messages;
   detecting the presence of one of the plurality of frequency hopped communications signals from the received acoustic data, wherein said step of detecting further comprises:
   filtering the received acoustic data to remove undesirable frequencies and to condition the received acoustic data for processing;
   transforming the filtered data into a frequency domain signal;
   calculating a power spectrum for the frequency domain signal;
   frequency normalizing the calculated power spectrum to provide a frequency normalized power spectrum and a frequency normalized background estimate;
   time normalizing the frequency normalized power spectrum and a normalized background estimate from the frequency normalized background estimate;
   individually integrating groups of frequencies from the normalized power spectrum and normalizing by an expected power level for each group of frequencies and providing an integrator output indicating the variation of the power level of the group of frequencies from the normalized background noise estimate;
   picking the integrator output having the largest variation from the expected power level as a possible detection; and indicating a detection when the integrator output having the largest variation exceeds a predetermined number of standard deviations from the normalized background noise estimate;

developing a background noise estimate from the received acoustic data;

terminating and storing the detected communication signal;

assembling a cluster of signals from terminated and stored communication signals;

processing assembled clusters into a combination of symbols;

decoding the combination of symbols into a predetermined message; and providing an output corresponding to the predetermined message as the decoded message.

6. The method of claim 5 wherein said step of assembling a cluster of signals comprises the steps of:

collecting a batch of terminated and stored communication signals as a batch of unmatched detections;

maintaining a collection of identified clusters;

determining if each one of the unmatched detections should be identified with one of the collection of identified clusters;

removing identified detections from the batch of unmatched detections;

establishing a next remaining unmatched detection as a new cluster;

determining if each one of the remaining unmatched detections should be identified with the new cluster;

removing identified remaining unmatched detections from the batch of unmatched detections; and continuing with said step of establishing until all remaining unmatched detections have been one of established as new clusters and identified with new clusters.

7. The method of claim 5 wherein:

the frequency hopped communications signals are transmitted in a group having a number of signals;

the frequency hopped communications signals are coded with a specific signal frequency being associated with a symbol;

providing expected parameters for each codebook signal combination; and said step of processing assembled clusters comprises:

forming a collection of all possible cluster sequences from said assembled clusters, each collection having the same number of clusters as the number of signals, each cluster having cluster parameters associated therewith;

utilizing clusters meeting predetermined duration and bandwidth criteria;

matching each cluster frequency with the symbol associated with that cluster frequency within a predefined tolerance, each cluster sequence being a symbol sequence having cluster parameters;

comparing symbol sequences and cluster parameters against codebook signal combinations with expected parameters in said codebook and calculating a similarity score indicating the similarity of the signal sequence to the parameters for the codebook signal combination;

establishing the message as the message associated with the symbol combination having the greatest similarity.

8. The method of claim 7 further comprising the steps of:

identifying at least one assembled cluster as parity information;

checking each symbol sequence against said parity information; and enhancing said calculated similarity score when said checked symbol sequence agrees with said parity information.

* * * * *